(12) United States Patent
Li et al.

(10) Patent No.: US 11,607,770 B2
(45) Date of Patent: Mar. 21, 2023

(54) EFFICIENT ULTRA-PRECISE SHEAR THICKENING AND CHEMICAL SYNERGY POLISHING METHOD

(71) Applicant: HUNAN UNIVERSITY OF SCIENCE & TECHNOLOGY, Xiangtan (CN)

(72) Inventors: Min Li, Xiangtan (CN); Cheng Tang, Xiangtan (CN); Ting Dong, Xiangtan (CN); Zhenrong Huang, Xiangtan (CN)

(73) Assignee: HUNAN UNIVERSITY OF SCIENCE & TECHNOLOGY, Xiangtan (CN)

( * ) Notice: Subject to any disclaimer, the term of this patent is extended or adjusted under 35 U.S.C. 154(b) by 298 days.

(21) Appl. No.: 16/964,572

(22) PCT Filed: Jan. 28, 2019

(86) PCT No.: PCT/CN2019/073357
§ 371 (c)(1),
(2) Date: Jul. 23, 2020

(87) PCT Pub. No.: WO2019/149165
PCT Pub. Date: Aug. 8, 2019

(65) Prior Publication Data
US 2021/0031328 A1    Feb. 4, 2021

(30) Foreign Application Priority Data
Jan. 31, 2018 (CN) .......................... 201810095554.2

(51) Int. Cl.
*B24B 37/015* (2012.01)
(52) U.S. Cl.
CPC .................................. *B24B 37/015* (2013.01)

(58) Field of Classification Search
CPC ......... B24B 37/015; B24B 1/00; B24B 57/00; C09G 1/02
(Continued)

(56) References Cited

U.S. PATENT DOCUMENTS 5,964,644 A * 10/1999 Rhoades ................. B24C 11/00
451/39
2010/0314572 A1   12/2010 Bose et al.
(Continued)

FOREIGN PATENT DOCUMENTS

CN          104308670 A         1/2015
CN          107075411 A         8/2017

*Primary Examiner* — Joseph J Hail
*Assistant Examiner* — Shantese L McDonald
(74) *Attorney, Agent, or Firm* — Jiwen Chen; Joywin IP Law PLLC (57) ABSTRACT

An efficient ultra-precise shear thickening and chemical synergy polishing method, comprising the following steps: 1) fixing workpieces (3) to a polishing and fixing disc (31) of implementation equipment; 2) preparing an efficient ultra-precise shear thickening and chemical synergy polishing slurry, the polishing slurry comprising polishing abrasive particles or micro-powder, a shear thickening enhanced phase, water and green chemistry environmentally-friendly substances; 3) adding the prepared polishing slurry into a dust-prevention cover (30), and starting a polishing slurry circulating device, so that the polishing slurry is supplied to the surfaces of the workpieces (3) by means of polishing tools (1); and 4) starting driving devices (9) and driving mechanisms (33), so that the polishing tools (1) move relative to the workpieces (3), and surfaces of the workpieces (3) to be machined are polished. In the present invention, active constraint of the solution flow boundary as well as active control of the flow of the polishing slurry and the synergy between shear thickening and green chemistry are utilized, so that the machining efficiency and precision (Continued)

are improved, and the types of materials that can be machined and the surface shapes are increased.

4 Claims, 3 Drawing Sheets

(58) Field of Classification Search
USPC .............................. 451/7, 28, 41, 488, 524
See application file for complete search history.

(56) References Cited

U.S. PATENT DOCUMENTS

| 2012/0040590 A1* | 2/2012 | Burge | B24B 37/24 |
| | | | 451/28 |
| 2016/0101500 A1* | 4/2016 | Fung | B24B 55/02 |
| | | | 451/527 |

* cited by examiner

EFFICIENT ULTRA-PRECISE SHEAR THICKENING AND CHEMICAL SYNERGY POLISHING METHOD

This is a U.S. national stage application of PCT Application No. PCT/CN2019/073357 under 35 U.S.C. 371, filed Jan. 28, 2019 in Chinese, claiming priority of Chinese Application No. 201810095554.2, filed Jan. 31, 2018, all of which are hereby incorporated by reference.

TECHNICAL FIELD OF THE INVENTION

The present invention belongs to the technical field of ultra-precise machining and particularly relates to a shear thickening and chemical synergy polishing method.

BACKGROUND OF THE INVENTION

Polishing has always been the most important method for ultra-precise machining, and its main role is to reduce the surface roughness of the workpieces, remove the damaged layers, correct the surface shape errors, and obtain high-precision and high-surface-quality final machining processes. Research and development of high-efficiency, high-quality, high-precision, low-cost ultra-precise machining methods has always been one of the main directions of improving the polishing technology. In many application fields of science and technology, there are various hard and brittle or soft and brittle materials that are difficult to process, such as special optical glass, sapphire, silicon nitride, monocrystalline silicon and lithium tantalite. In terms of surface shapes, various technological products are increasingly developing toward curved surfaces or even complex curved surfaces, further increasing the difficulty of its ultra-precise processing. The curved surfaces include not only axisymmetric surface shapes such as cylindrical surfaces and spherical surfaces, but also complex curved surfaces combined by curved surfaces with multiple curvatures to achieve high precision of certain mathematical features and the pursuit of functions and aesthetic effects. The curved surfaces have been widely used as the working surfaces of industrial products and parts thereof in the modern high-tech fields. For example, aero-engine blades with complex curved surfaces can effectively improve the working efficiency; aspheric optical parts can effectively correct various types of aberrations, greatly improving the recognition ability of instruments and equipment; biomedical implants, auto parts, etc., increasingly use curved surface shapes for the pursuit of functions and aesthetic effects.

The currently available precise processing/machining or ultra-precise polishing processes for a variety of materials (including plastic, brittle, hard and brittle, soft and brittle materials that are difficult to machine) and parts with various surface shapes (aspheric curved surfaces, irregular surfaces, and basic surfaces including flat surfaces, cylindrical surfaces, spherical surfaces, etc.) mainly include computer-controlled surface forming, magnetic field or electric field assisted polishing, abrasive particle flow machining, bonnet polishing and chemical mechanical polishing. Computer-controlled surface forming belongs to the traditional contact polishing. Generally, small polishing tools are used to adapt to the change in curvature of the curved surfaces of the workpieces, and high surface shape precision is obtained at the expense of polishing efficiency. However, the low coincidence between the curvature of the polishing tools and the curved surfaces to be machined affects the machining precision. Magnetic field (or electric field) assisted polishing is to use a magnetic field (or an electric field) to control magnetic abrasive particles or magnetorheological polishing slurry (or electrorheological slurry) to polish the surfaces of the workpieces. It is a kind of efficient and flexible polishing methods that can realize very good machining effects. However, the preparation cost of the critical magnetorheological slurry used in this polishing method is as expensive as that of the electrorheological slurry used in electrorheological polishing and that of the magnetic slurry used in magnetic suspension polishing. The high use cost restricts the application of this type of polishing methods. Abrasive particle flow machining is to remove the material of the workpieces by repeatedly passing the viscoelastic body (containing abrasive particles) through the surfaces of the workpieces under a certain pressure through a complex abrasive particle flow propulsion system. The efficiency in removing the material of the workpieces is low, and the quality of the surfaces of the workpieces is greatly affected by the difference in size of abrasive particles. Bonnet polishing is to polish the workpieces by using a pressure-controllable inflatable airbag as a polishing tool. Restricted by the size of the machining tool, only workpieces with surface shapes having a medium-large diameter can be machined, and it is difficult to control the edge polishing precision. Relying on the mechanical and chemical interaction among the abrasive particles, workpieces and environments, chemical mechanical polishing uses chemical polishing slurry containing abrasives to achieve ultra-smooth, less/no-damage machining of sapphire and quartz, and does not require any high-precision polishing equipment. However, it is necessary to treat the chemical polishing slurry for environmental protection. Electrolytic polishing is to polish the workpieces based on the principle that anodic dissolution occurs in microscopic protrusions on the metal surface in a specific electrolyte and at an appropriate current density. This polishing method can ensure good machining precision and surface quality, high machining efficiency, and low cost. Thus, it is suitable for metal workpieces. However, electrolytic polishing has the following deficiencies: it is highly sensitive to the ordered organizations of the surfaces; it is difficult to maintain the precision in the size and geometry of the parts; and there may be spots on the polished surfaces of the workpieces. Elastic emission machining can obtain ultra-smooth and undamaged surfaces. However, the amount of material removal is just in atomic-scale units, and the machining efficiency is low and is restricted by the applications. Stressed-lap polishing is to preferentially remove the highest point of the surface. This polishing method can well control the medium and high frequency errors. However, it is mainly used for the machining of ultra-large space aspheric mirrors and is high in cost.

The granted Chinese Invention Patent (ZL201210192915.8) disclosed an ultra-precise curved surface polishing method based on the shear thickening effect of non-Newtonian fluids. The part of polishing slurry in contact with the workpieces is thickened by shearing. The increased viscosity of the polishing slurry in the contact area enhances the holding of the abrasive particles or micro-powder. The abrasive particles or micro-powder in the polishing slurry have a micro-cutting effect or a chemical mechanical effect on the workpieces to remove the surface material of the workpieces, so as to polishing the surfaces of the workpieces. The granted Chinese Invention Patent (ZL201310275700.7) disclosed a polishing device based on the shear thickening principle of non-Newtonian fluids, comprising a polishing tool system with a computer-controlled running trajectory, a stable non-Newtonian fluid abrasive slurry circulating device, a workbench and a control system connected with various components. The workbench can hold workpieces of various sizes, and has multiple degrees of freedom, which is convenient to adapt to the change in workpiece postures required by the polishing of various surface shapes. Since, in the above two patented technologies, the shear thickening effect is passively produced only by driving the polishing slurry tank to move the polishing slurry relative to the workpieces, it is difficult to realize active constraint on the boundary of the slurry film in the workpiece machining area and effective control of the flow trajectory. Although the surface roughness of external circular surfaces such as cylindrical surfaces and spherical surfaces (or other convex curved surfaces) of plastic materials and monocrystalline silicon wafer materials can be reduced to a certain extent, the machining efficiency needs to be further improved. Especially the machining quality and efficiency of hard and brittle materials such as silicon nitride and sapphire are limited, and it is even more difficult to machine parts with concave curved surfaces (such as curved workpieces made of sapphire and bearing outer ring raceways), thereby limiting the range of materials that can be machined. In addition, there is a problem about how to effectively control the material removal definiteness of this method to ensure the precision of surface shapes. It is difficult to meet some special machining requirements.

The granted Chinese Invention Patent (ZL 201410436510.3) disclosed an ultra-precise machining method based on the combined effect of shear thickening and electrolysis of non-Newtonian fluids. It is combined machining based on the effects of shear thickening and electrolysis of non-Newtonian fluids. Structures such as conducting electrodes are required to solve the presence of spots on the surfaces of electrolytically polished workpieces and improve the machining efficiency. However, this method has poor adaptability to the surface shapes of the workpieces that can be machined and cannot ensure the material removal definiteness. It is difficult to realize the definite polishing and the high surface shape precision of the workpieces. The workpieces to be machined must have conductive properties (such as metallic conducting materials). The range of materials that can be machined is limited. For example, it is unable to machine conductive metallic plastics. In addition, the existing electrolytes, as non-environmentally friendly substances, still have a certain negative impact on the environment. This increases the cost of treatments for environmental protection, thereby increasing the machining costs to a certain extent.

The granted Chinese Invention Patent (ZL201410436897.2) disclosed an ultra-precise machining device based on the combined effect of shear thickening and electrolysis of non-Newtonian fluids, comprising polishing tools, polishing tool holders, workpiece holders and a polishing pool. The conducting members of the workpiece holders are connected to the anode of the power supply, and the conducting members of the polishing tool holders are connected to the cathode of the power supply. A polishing slurry is prepared by adding abrasive particles or micropowder to a non-Newtonian fluid with a shear thickening effect, and an electrolyte component is added so that the polishing slurry has both an electrolytic effect and a shear thickening effect. After the power supply is energized, an electrochemical reaction occurs between the anode workpieces and the cathode polishing tools. The metal on the surfaces of the workpieces is electrolytically dissolved, and then an oxide film that hinders the electrochemical reaction is formed on the surfaces of the workpieces. The oxide film at protrusions on the surfaces of the workpieces is first worn away to expose fresh metal, and the electrochemical reaction can continue at the protrusions. The oxide film at the depressions is not removed, the chemical reaction is hindered, and the metal at the depressions is protected. Meanwhile, due to the peak effect of electric current, the electric field strength at the protrusions is high, and the corrosion to the metal is strong. In addition, by the shear thickening, the abrasive particles can better remove the protrusions on the surfaces of the workpieces. As a result, the protrusions on the surfaces of the workpieces are quickly removed, and the surface roughness is rapidly reduced. In this patent, the workpieces are mainly machined by the electrochemical reaction between the anode workpieces and the follower tools based on electrolysis and shear thickening effects. Therefore, it works well for the machining of conductive materials. However, it is difficult to properly machine non-conductive materials that are difficult to be machined, such as hard and brittle materials; and the subsequent processing cost is high since the electrolytes are non-environmentally friendly.

The granted Chinese Invention Patent (ZL200610029268.3) disclosed a polishing slurry for polishing low-dielectric materials. The polishing slurry comprises abrasives and water, and further comprises one or more metal chelating agents, azole film-forming agents and oxidants. The polishing slurry can have a high removal rate of low-dielectric materials at a lower pressure, and a suitable polishing selection ratio for other materials. The polished workpieces have good surface finish. However, this polishing slurry is used to polish only low-dielectric materials. For workpieces made of non-low-dielectric materials, the polishing quality is low. The range of materials that can be machined is small. There is no control on the surface shapes and precision of the workpieces and it is unable to ensure that workpieces with surface shapes, such as curved surfaces, can be machined. In this patent, non-environmentally friendly substances such as chelating agents, azole film-forming agents and oxidants are used, so both the steps and the cost in treating the waste polishing slurry are increased.

SUMMARY OF THE INVENTION

To solve the technical problems, the present invention provides an efficient ultra-precise shear thickening and chemical synergy polishing method with diverse types of materials that can be machined and surface shapes, high production efficiency and high precision of the machined products.

The present invention employs the following technical solutions to solve the technical problems.

An efficient ultra-precise shear thickening and chemical synergy polishing method is provided; implementation equipment for this method comprises polishing tools, polishing tool holders, a polishing and fixing disc, a dust-prevention cover and a polishing slurry circulating device; the polishing and fixing disc is mounted in the dust-prevention cover, configured to receive workpieces, and connected to driving mechanisms; the polishing tool holders, on which the polishing tools are mounted, are arranged on the dust-prevention cover, and driving devices connected to the polishing tools are arranged on the top of the polishing tool holders; the polishing tools are arranged in the dust-prevention cover and located exactly or directly above workpiece holders; and a polishing slurry outlet is formed on the bottom of the dust-prevention cover;

each of the polishing tools comprises a polishing slurry property adjustment chamber and a hollow tube, an upper end of the hollow tube is connected to an outlet of the polishing slurry property adjustment chamber, an inlet of the polishing slurry property adjustment chamber is connected to an outlet of the polishing slurry circulating device, and an inlet of the polishing slurry circulating device is connected to the polishing slurry outlet; a cavity, in which a solution flow boundary constraint mechanism is arranged, is formed at a lower end of the polishing tool, and the solution flow boundary constraint mechanism can realize active constraint of the solution flow and fit surface shapes of workpieces.

The method comprises the following steps:

(1) fixing workpieces to a polishing and fixing disc of implementation equipment;

(2) preparing a polishing slurry, the polishing slurry containing following ingredients in percent by weight: 10 wt. % to 20 wt. % of polishing abrasive particles or micro-powder, 20 wt. % to 30 wt. % of a shear thickening enhanced phase, 39 wt. % to 50 wt. % of water and 1 wt. % to 26 wt. % of green chemistry environmentally-friendly substances, specifically: first, fully mixing the polishing abrasive particles or micro-powder and the shear thickening enhanced phase in a mixer, then adding the mixture of the polishing abrasive particles or micro-powder and the shear thickening enhanced phase to water, uniformly stirring, and then mixing with the green chemistry environmentally-friendly substances to obtain a shear thickening and chemical synergy polishing slurry;

(3) adding the prepared polishing slurry into a dust-prevention cover, starting a polishing slurry circulating device so that the polishing slurry is supplied to the surfaces of the workpieces by means of the polishing tools, and regulating the temperature of the polishing slurry in a working area by a temperature regulator arranged on a hollow tube; and (4) starting driving devices and driving mechanisms, so that the polishing tools move relative to the workpieces, and processing surfaces of the workpieces are polished.

In efficient ultra-precise shear thickening and chemical synergy polishing method, the polishing abrasive particles or micro-powder in the step (2) is one or more of $Al_2O_3$, CBN, diamond, $SiO_2$, cerium oxide, SiC, etc. (or abrasive particles that, having other ingredients, can remove the material of the workpieces).

In the efficient ultra-precise shear thickening and chemical synergy polishing method, the shear thickening enhanced phase in the step (2) is natural plant fiber polymers or natural plant fiber polymer based composites, and the green chemistry environmentally-friendly substances are natural green plants extracts or green chemistry environmentally-friendly mixtures that can realize transformation from the acidic or alkaline property to the neutral property.

In the efficient ultra-precise shear thickening and chemical synergy polishing method, the polishing slurry circulating device of the implementation equipment comprises a polishing slurry purification device, a polishing slurry temperature control and regulation device, a device for replenishing the polishing slurry and mixing with the green chemistry environmentally-friendly substances, a supply pump, a chemical substance supply device and a branch pipeline; an inlet of the supply pump is connected to the polishing slurry outlet via a pipe, and the polishing slurry purification device, the polishing slurry temperature control and regulation device, and the device for replenishing the polishing slurry and mixing with the green chemistry environmentally-friendly substances are arranged on the pipe; an outlet of the supply pump is connected to an inlet of the chemical substance supply device, and an outlet of the chemical substance supply device is connected to the inlet of the polishing slurry property adjustment chamber; an inlet of the branch pipeline is connected to a pipe to which the outlet of the supply pump and the inlet of the chemical substance supply device are connected, and an outlet of the branch pipeline is arranged correspondingly to the workpieces; and a polishing slurry property adjustment device is arranged on the branch pipeline; and in the step (4), during the polishing process, when it is needed to replenish the polishing slurry, the polishing slurry is replenished by adding the polishing slurry to the device for replenishing the polishing slurry and mixing with the green chemistry environmentally-friendly substances; when it is needed to replenish the green chemistry environmentally-friendly substances, the green chemistry environmentally-friendly substances are replenished by adding the green chemistry environmentally-friendly substances to the device for replenishing the polishing slurry and mixing with the green chemistry environmentally-friendly substances or to the chemical substance supply device; and when it is needed to adjust the property of the polishing slurry, the property of the polishing slurry is adjusted by the polishing slurry property adjustment device.

Compared with the prior art, the present invention has the following beneficial effects.

(1) In the present invention, active constraint of the solution flow boundary as well as active control of the flow of the polishing slurry and the synergy between shear thickening and green chemistry are utilized, so that the machining or processing efficiency and precision are improved, and the types of materials that can be machined (including plastic, brittle, hard and brittle, soft and brittle materials that are difficult to machine) and the surface shapes (aspheric curved surfaces, irregular surfaces, and basic surfaces including flat surfaces, cylindrical surfaces, spherical surfaces, etc.) are increased.

(2) The present invention belongs to a flexible machining method. The active solution flow boundary constraint mechanism can control, based on the actual solution flow boundary and the shear thickened elastic layer size requirements, the constraint base surfaces to have a certain motion (for example, doing micro-rotation, moving up and down, to control the boundary and the shear thickened elastic layer size), and the constraint base surfaces will be adaptively deformed in the processes of adjusting the shear thickened elastic layer, adjusting the dynamic pressure, and matching the surface shapes of the workpieces to be machined, in order to actively match the surface shapes and complex curved surfaces of the workpieces to be machined. The flow field and dynamic pressure distribution in the polishing area can be effectively controlled, and the size of the shear thickened elastic layer can be further actively controlled. The dynamic distribution of the polishing slurry flow field is improved, the material removal definiteness is increased, and there are less surface metamorphic layers. This method can be used to machine various surface shapes (aspheric curved surfaces, specially-shaped surfaces and basic shapes including flat surfaces, cylindrical surfaces, spherical surfaces, etc.).

(3) The raw materials of the polishing slurry used in the present invention are easy to obtain, green and environmentally friendly, low in cost, good dispersion of abrasive particles therein, and can play a green chemical role with high efficiency. The green chemistry environmentally-friendly substances may be natural green plants extracts, or may be affected by temperature (they are neutral substances at normal temperature; during the machining, they become acidic or alkaline substances in the machining area as the machining temperature changes to a certain value; they can circulate and quickly return to the neutral properties of the initial polishing slurry as the temperature drops at positions outside the machining area, and maintain the original environmentally-friendly properties), or green chemistry mixtures that can realize transformation from the acidic or alkaline property to the neutral property (it is ensured that they are neutral in the initial stage, play a chemical role in the machining area, and return to be neutral when circulating).

(4) The present invention has relatively low requirements on the machining equipment.

DETAILED DESCRIPTION OF THE INVENTION

The present invention will be further described below with reference to the accompanying drawings by embodiments:

As shown in FIGS. 1-4, the implementation equipment in the present invention comprises a polishing and fixing disc 31, a dust-prevention cover 30 and a polishing slurry circulating device. Four polishing tool holders 11 are arranged on the top of the dust-prevention cover 30. The polishing tool holders 11 are arranged or spaced apart evenly along the circumferential direction. One polishing tool 1 is mounted on each polishing tool holder 11. One driving device 9 is mounted on the top of the polishing tool holder 11. The driving device 9 is connected to the polishing tool 1 and can drive the polishing tool 1 to rotate. The polishing tool 1 comprises a polishing slurry property adjustment chamber 10 and a hollow tube. An upper end of the hollow tube is connected to an outlet of the polishing slurry property adjustment chamber 10 and a lower end thereof is located in the dust-prevention cover 30. A temperature controller 34 is arranged on the hollow tube. An inlet of the polishing slurry property adjustment chamber 10 is connected to an outlet of the polishing slurry circulating device, and an inlet of the polishing slurry circulating device is connected to the polishing slurry outlet on the bottom of the dust-prevention cover 30. A cavity, in which a solution flow boundary constraint mechanism 2 is arranged, is formed at a lower end of the polishing tool 1, and the solution flow boundary constraint mechanism 2 is a disc structure having run-through pores. The solution flow boundary constraint mechanism 2 is mounted in the cavity by a driving mechanism 33. The driving mechanism 33 can drive the solution flow boundary constraint mechanism 2 to rotate and move up and down.

The solution flow boundary constraint mechanism 2 can be equipped with corresponding polishing constraint base surfaces 35 according to different workpiece surface shapes, and has features such as regular micro-pore arrays and curved surfaces adapted to the surface shapes of the workpieces to be machined, so that the polishing slurry flows in and out to form a shear thickened elastic layer with controllable active constraint. An intelligent system 36 can control, based on the actual solution flow boundary and the shear thickened elastic layer size requirements, the constraint base surfaces 35 to have a certain motion (for example, rotating, moving up and down, to control the boundary and the shear thickened elastic layer size). The flow field and dynamic pressure distribution in the polishing area can be effectively controlled, and the size of the shear thickened elastic layer can be further actively controlled.

The polishing and fixing disc 31 is mounted in the dust-prevention cover 30. A driving device 19 is arranged on the bottom of the dust-prevention cover. An output shaft of the driving device 19 is connected to the polishing and fixing disc 31. A swing mechanism 18 is arranged on the bottom of the polishing and fixing disc 31. The swing mechanism is a cone that is large in top and small in bottom. The workpiece holders 4, on which the workpieces are placed, are arranged on the polishing and fixing disc 31. The workpiece holders 4 are located exactly below the polishing tools 1. Depending upon the size of the workpieces 3, two or more workpieces and polishing systems 29 therefor can be fixed to the polishing and fixing disc 31. This facilitates the improvement of the machining efficiency. The whole polishing area is protected by the dust-prevention cover 30.

The polishing slurry circulating device comprises a polishing slurry purification device 14, a polishing slurry temperature control and regulation device 15, a device for replenishing the polishing slurry and mixing with the green chemistry environmentally-friendly substances 16, a supply pump 17, a chemical substance supply device 7 and a branch pipeline. An inlet of the supply pump 17 is connected to the polishing slurry outlet via a pipe 13. The polishing slurry purification device 14, the polishing slurry temperature control and regulation device 15, and the device for replenishing the polishing slurry and mixing with the green chemistry environmentally-friendly substances 16 are arranged on the pipe 13. An outlet of the supply pump 17 is connected to an inlet of the chemical substance supply device 7, and an outlet of the chemical substance supply device 7 is connected to the inlet of the polishing slurry property adjustment chamber 10. An inlet of the branch pipeline is connected to a pipe to which the outlet of the supply pump 17 and the inlet of the chemical substance supply device 7 are connected, and an outlet of the branch pipeline is arranged correspondingly to the workpieces. A polishing slurry property adjustment device 6 is arranged on the branch pipeline. The chemical substance supply device 7 can supply green chemistry environmentally-friendly substances to the inlet 8 of the polishing tool 1 (can supply substances such as $H^+$ and $OH^-$ or other conditioning agents). The green chemistry environmentally-friendly substances may be natural green plants extracts, or may be affected by temperature (they are neutral substances at normal temperature; during the machining, they become acidic or alkaline substances in the machining area as the machining temperature changes to a certain value; they can circulate and quickly return to the neutral properties of the initial polishing slurry as the temperature drops at positions outside the machining area, and maintain the original environmentally-friendly properties), or green chemistry mixtures that can realize transformation from the acidic or alkaline property to the neutral property (it is ensured that they are neutral in the initial stage, play a chemical role in the machining area, and return to be neutral when circulating). The processed polishing slurry 12 becomes the polishing slurry 5 that is used for machining, after flowing through the polishing slurry purification device 14, the polishing slurry temperature control and regulation device 15, the device for replenishing the polishing slurry and mixing with the green chemistry environmentally-friendly substances 16, and the supply pump 17.

Figure 1:
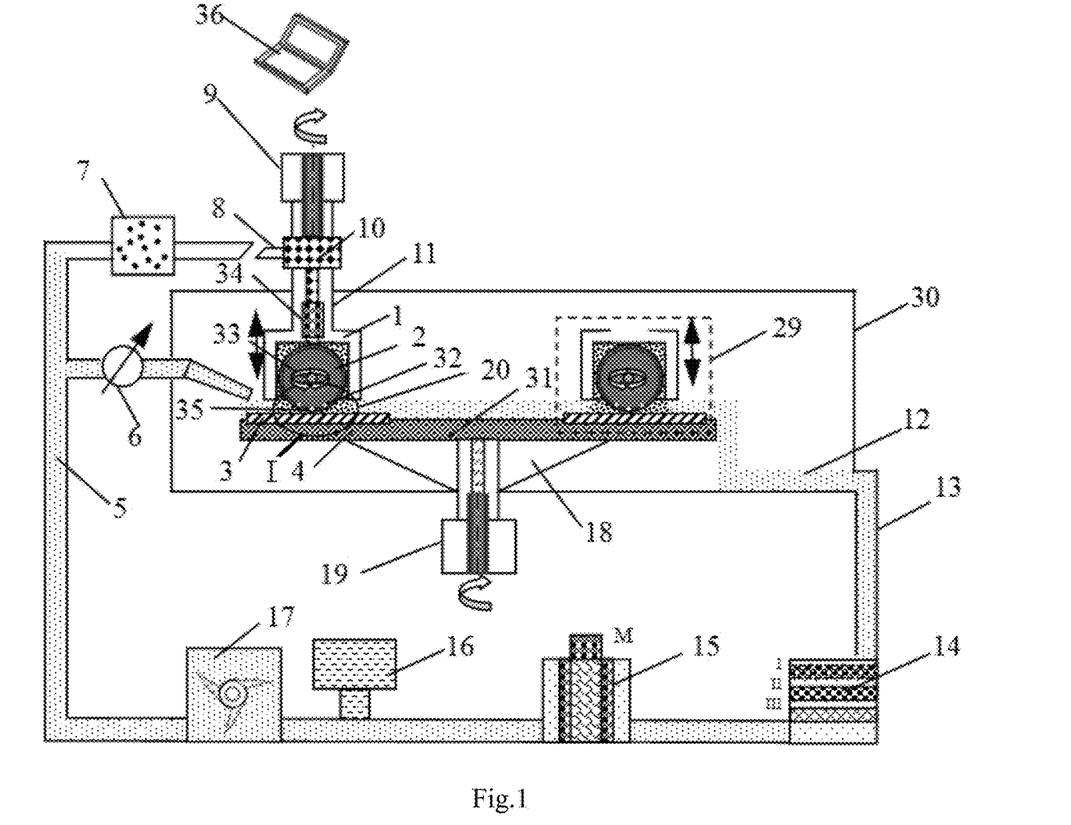
FIG. 1 is a structure diagram of implementation equipment of the present invention.

The polishing slurry purification device 14 comprises: a multi-dimensional filter device, which hierarchically and multi-dimensionally filters debris (capable of filtering and purifying not only conductive metallic plastics and also non-conductive materials that are difficult to machine, such as hard and brittle or soft and brittle materials) and purities resulted during the machining process, a collector for effective substances in the polishing slurry, etc. The metallic materials may be separated by electromagnetic force effect and vibration. The hard and brittle or soft and brittle materials may be separated by hierarchically screening according to the particle sizes.

The polishing slurry temperature control and regulation device 15 can control the temperature of the polishing slurry at 25° C. to 50° C. By cooling by supplying cold water in an "M" shape, it can quickly regulate the temperature to a suitable range.

The device for replenishing the polishing slurry and mixing with the green chemistry environmentally-friendly substances 16 comprises a polishing slurry replenishment device, a green chemistry environmentally-friendly substance replenishment device, a polishing slurry shear thickening enhanced phase property adjustment device, etc.

Figure 3:
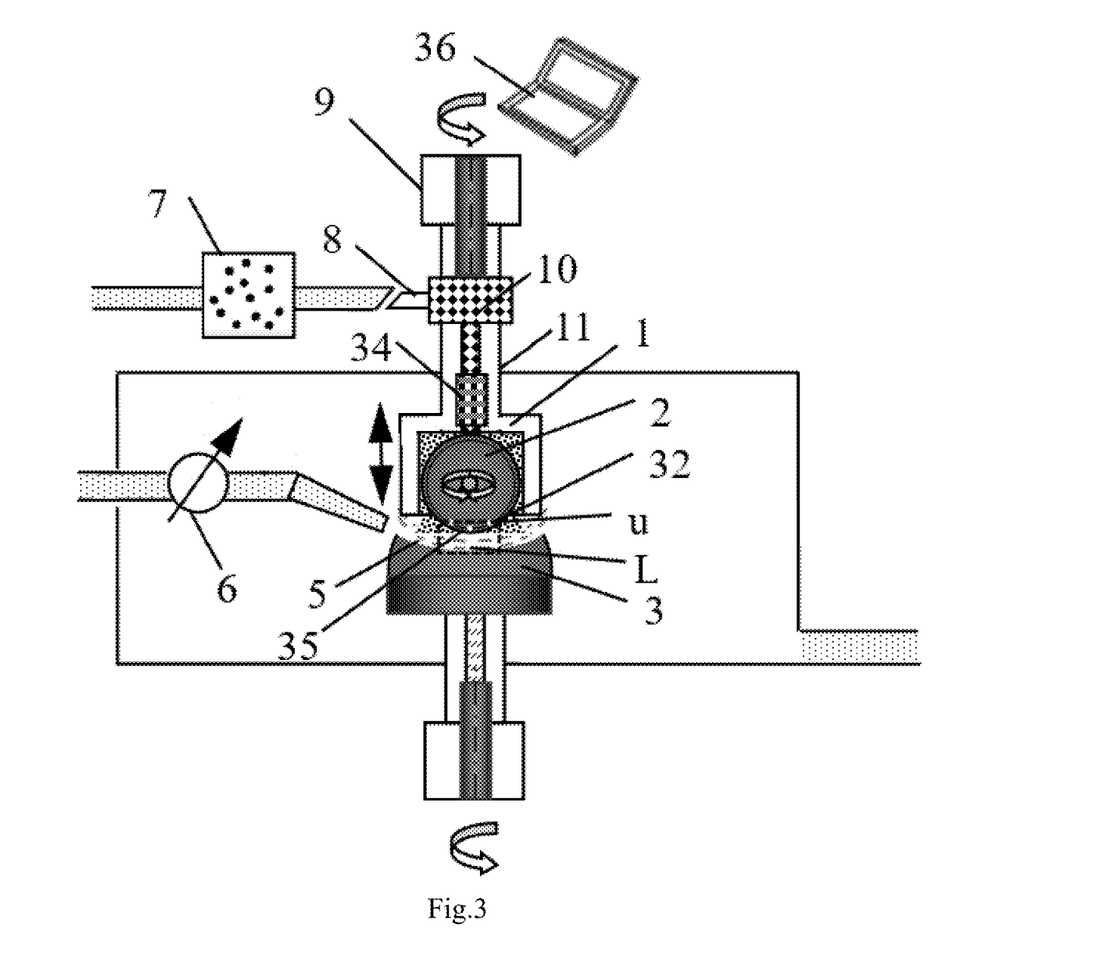
FIG. 3 is a structure diagram of the implementation equipment of the present invention, when machining concave curved surfaces.
Figure 4:
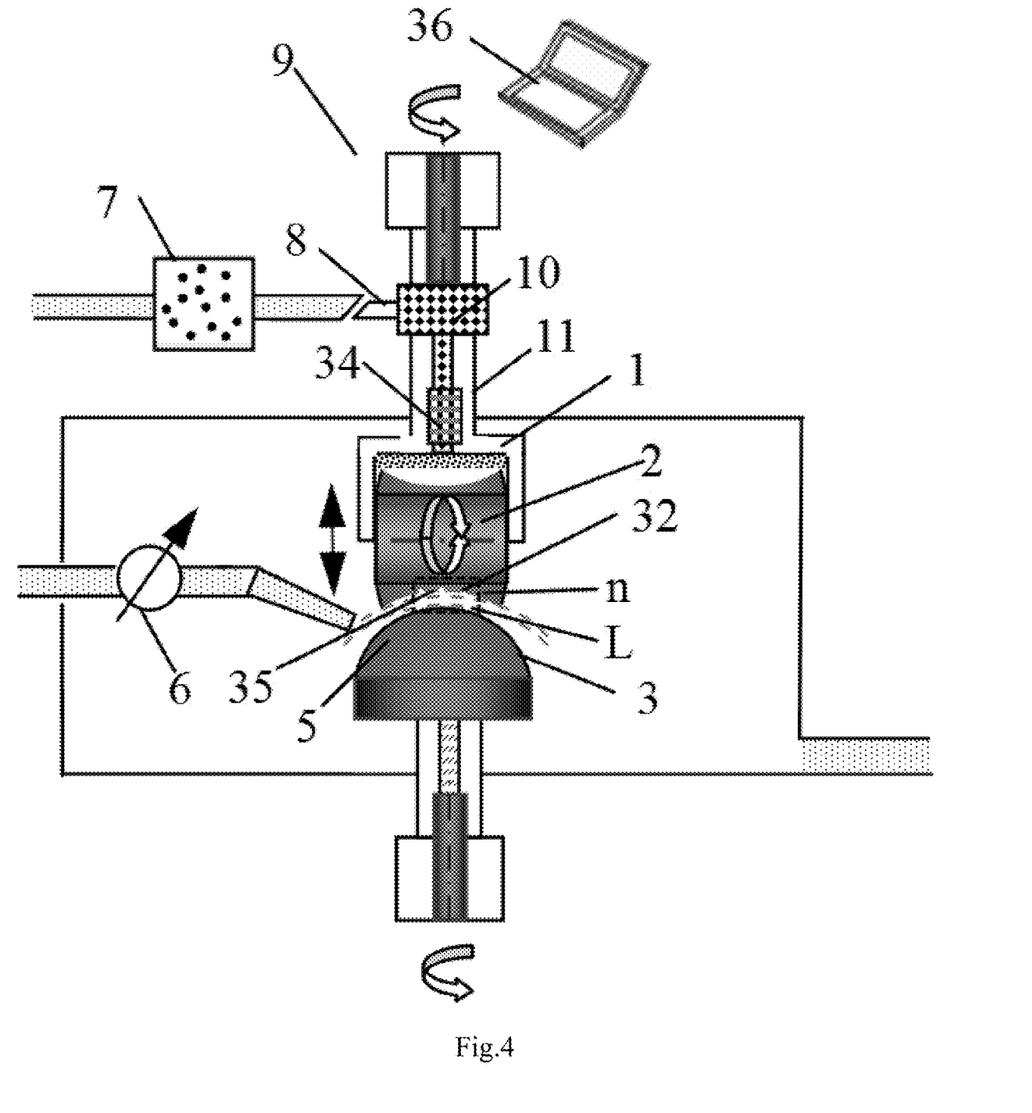
FIG. 4 is a structure diagram of the implementation equipment of the present invention, when machining convex curved surfaces.

The solution flow boundary constraint mechanism 2 can control, based on the actual solution flow boundary and the shear thickened elastic layer size requirements, the constraint base surfaces 35 to have a certain surface texture and have a certain motion (for example, rotating, moving up and down, to control the boundary and the shear thickened elastic layer size), in order to match the surface shapes of the workpieces (basic surface shapes such as flat surfaces or complex specially-shaped surfaces such as curved surfaces). By special processes, run-through pores 31 are formed in the solution flow boundary constraint mechanism 2. The polishing slurry 5 may flow to the surfaces of the workpieces 3 from a hollow tube arranged at a lower end of the polishing tool 1, and may also flow through the machining area on the surfaces of the workpieces 3 from the run-through pores 31. The solution flow boundary constraint mechanism 2 may be driven by the driving mechanism 33 to do micro-rotation or move up and down, and may be driven by the driving mechanism 9 to control the shear thickened elastic layer, solution flow field and dynamic pressure between the polishing slurry 5 and the surface of the solution flow boundary constraint mechanism 2. Meanwhile, the constraint base surfaces 35 of the solution flow boundary constraint mechanism 2 will be adaptively deformed in the processes of adjusting the shear thickened elastic layer, adjusting the dynamic pressure, and matching the surface shapes of the workpieces to be machined, in order to actively match the surface shapes and complex curved surfaces of the workpieces to be machined. The constraint base surfaces 35 are deformed to a tiny flat shape as shown in FIG. 1 to match the flat surface shape of the workpieces, a convex "n" shape as shown in FIG. 3 to match the concave curved surface shape of the workpieces, and a concave "u" shape as shown in FIG. 4 to match the convex curved surface shape of the workpieces.

Embodiment 1

Figure 2:
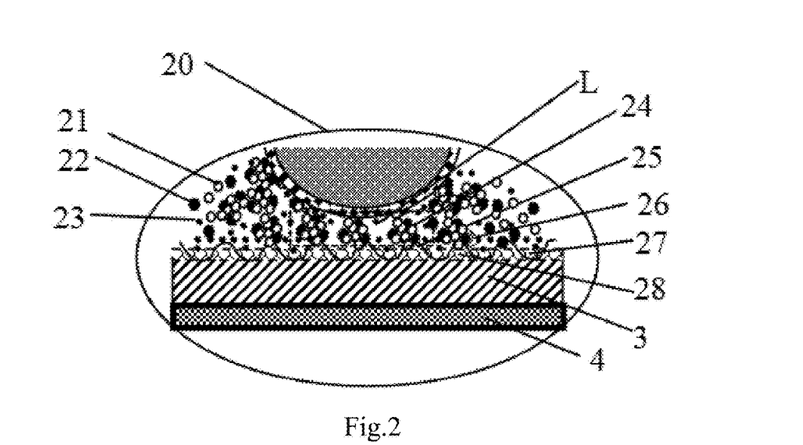
FIG. 2 is an enlarged view of part I of FIG. 1.

As shown in FIGS. 1 and 2, when workpieces, which have flat surfaces made of silicon nitride and which are 30 mm (length)×30 mm (width)×6 mm (height) in size, are to be machined, the method comprises following steps.

(1) Workpieces were fixed to a polishing and fixing disc 31 of implementation equipment. Three workpieces and polishing systems 29 therefor were fixed to the polishing and fixing disc 31. This facilitates the improvement of the production efficiency.

(2) An efficient shear thickening and chemical synergy polishing slurry was prepared. Following ingredients in percent by weight were prepared: 15% of diamond (or, $SiO_2$, SiC) as polishing abrasive particles, 25% of a shear thickening enhanced phase, 50% of water and 10% of green chemistry environmentally-friendly substances. First, the polishing abrasive particles and the shear thickening enhanced phase were fully mixed in a mixer for 12 hours; then, the mixture of the SiC and the shear thickening enhanced phase was added to water, uniformly stirred until the solution was homogeneous, and then mixed with the green chemistry environmentally-friendly substances at 25° C. to obtain an efficient shear thickening and chemical synergy polishing slurry 5. The shear thickening enhanced phase is natural plant fiber polymers or natural plant fiber polymer based composites (for example, $\Omega\text{-}(OH^-)_c$ or corresponding fiber composites, where $\Omega$ is the functional group in fiber, and c is the number of corresponding $OH^-$); and the green chemistry environmentally-friendly substances are natural green plant extracts or green chemistry environmentally-friendly mixtures that can realize transformation from the acidic or alkaline property to the neutral property (for example, $H^+_a\text{-}\Theta\text{-}(OH^-)_b$, where $\Theta$ is the function group, a and b are the number of corresponding $H^+$ and $OH^-$). The green chemistry environmentally-friendly substances may be affected by temperature. They are neutral substances at normal temperature. During the machining, they become acidic or alkaline substances in the machining area as the machining temperature changes to a certain value. They can circulate and quickly return to the neutral properties of the initial polishing slurry as the temperature drops at positions outside the machining area, and maintain the original environmentally-friendly properties.

(3) The prepared polishing slurry was added into the dust-prevention cover 30. The polishing slurry circulating device, comprising a polishing slurry purification device 14, a polishing slurry temperature control and regulation device 15, a device for replenishing the polishing slurry and mixing with the green chemistry environmentally-friendly substances 16, a supply pump 17, a chemical substance supply device 7 and a branch pipeline, was started so that the efficient shear thickening and chemical synergy polishing slurry 5 was supplied to the surfaces of the workpieces 3 by means of the polishing tools 1, and the temperature of the polishing slurry in a working area was regulated by a temperature regulator 34 arranged on a hollow tube. The polishing slurry 5 may flow to the surfaces of the workpieces 3 from a hollow tube arranged at a lower end of the polishing tool 1, and may also flow through the machining area on the surfaces of the workpieces 3 from the run-through pores 31.

(4) The driving devices 9 and the driving mechanisms 33 were started so that the polishing tools 1 move relative to the workpieces. Since the workpieces to be machined have flat surfaces made of silicon nitride, an intelligent system 36 can control, based on the actual solution flow boundary and the shear thickened elastic layer size requirements, the constraint base surfaces 35 to have a certain motion (for example, rotating, moving up and down, to control the boundary and the shear thickened elastic layer size). The solution flow boundary constraint mechanism 2 was adaptively deformed in the processes of controlling the flow field and dynamic pressure distribution in the polishing area and matching the silicon nitride surface shape to be machined, in order to actively match the silicon nitride surface shapes and complex curved surfaces to be machined. The solution flow boundary constraint mechanism 2 was deformed to a tiny flat shape as shown in FIG. 1 or 2 to match the silicon nitride flat surface shape and contact state, in order to ensure the subsequent polishing of the silicon nitride surfaces.

During the polishing process, the temperature of the polishing slurry 5 in the surface layer of the workpieces 3 and the machining area was changed by the temperature regulator 34 so that the temperature at the run-through pores 32 in the solution flow boundary constraint mechanism 2 changed (and, changes due to the heat generated during polishing), and the reversible transformation of the green chemistry environmentally-friendly substances 23 from "the neutral property to the acidic or alkaline property" produced substances or conditioning agents such as $H^+$ and $OH^-$. A certain chemical reaction occurred between the acidic or alkaline particles and the surface layer of the workpieces. The materials on the surfaces of the workpieces 3 were softened. Then, a softened layer 28 was formed on the surfaces of the workpieces 3. Meanwhile, the workpieces 3 made of silicon nitride moved relative to the polishing tools 1, so that the polishing slurry 5 was shear thickened below the workpieces 3 made of silicon nitride and the solution flow boundary constraint mechanism 2 in the polishing tools 1. A shear thickened elastic layer L as shown in FIG. 1 or 2 was formed. The viscosity of the polishing slurry 5 (C-S) in this area was increased. The abrasive particles or micro-powder 22 can be held better to form a thickened particle elastic cluster 24. The abrasive particles or micro-powder 22 in the polishing slurry 5, having a function of polishing, have a micro-cutting effect on the surfaces of the workpieces 3. The microscopic protrusions on the surfaces of the workpieces 3 made of silicon nitride (i.e., the microcosmic layer, which forms chips or swarf 26, in the surface layer 27 of the workpieces 3 made of silicon nitride) were first removed. Chips or swarf 26 are produced. The fresh surface materials were exposed. The softened layer 28 at the microcosmic depressions had been softened by the polishing slurry 5, and could be quickly removed in the subsequent continuous polishing. The surface roughness was greatly decreased, and the damage to the surfaces and sub-surfaces of the workpieces was reduced. The removal of materials based on the synergy between chemistry and shear thickening greatly increased the machining efficiency of workpieces made of silicon nitride.

The polishing slurry 5 was circulated, in an order of supplying, purifying and supplying, by the circulating device comprising a polishing slurry purification device 14, a polishing slurry temperature control and regulation device 15, a device for replenishing the polishing slurry and mixing with the green chemistry environmentally-friendly substances 16, a supply pump 17, a chemical substance supply device 7 and a branch pipeline. The polishing slurry temperature control and regulation device 15 could control the temperature of the polishing slurry at 25° C. to 50° C. By cooling by supplying cold water in an "M" shape, it could quickly regulate the temperature to a suitable range. A polishing slurry property adjustment device 6 was arranged on the branch pipeline. The chemical substance supply device 7 could supply green chemistry environmentally-friendly substances to the inlet 8 of the polishing tool 1 (can supply substances such as $H^+$ and $OH^-$ or other conditioning agents). The processed polishing slurry 12 became the polishing slurry 5 that was used for machining, after flowing through the polishing slurry purification device 14, the polishing slurry temperature control and regulation device 15, the device for replenishing the polishing slurry and mixing with the green chemistry environmentally-friendly substances 16, and the supply pump 17. The polishing slurry 5 was purified by the polishing slurry purification device 14. The polishing slurry purification device 14 comprised: a multi-dimensional filter device, which hierarchically and multi-dimensionally filters debris (capable of filtering and purifying not only conductive metallic plastics and also non-conductive materials that were difficult to machine, such as hard and brittle or soft and brittle materials) and purities resulted during the machining process, a collector for effective substances in the polishing slurry, etc. The metallic materials may be separated by electromagnetic force effect and vibration. The hard and brittle or soft and brittle materials may be separated by hierarchically screening according to the particle size. The device for replenishing the polishing slurry and mixing with the green chemistry environmentally-friendly substances 16 supplied the polishing slurry 5.

Embodiment 2

As shown in FIG. 3, when workpieces, which have concave curved surfaces made of optical glass and which have a diameter of 40 mm and a focal length of 100 mm, were machined, the method comprises following steps.

(1) Workpieces were fixed to a polishing and fixing disc 31 of implementation equipment. Two workpieces and polishing systems 29 therefor were fixed to the polishing and fixing disc 31. This facilitates the improvement of the production efficiency.

(2) An efficient shear thickening and chemical synergy polishing slurry was prepared. Following ingredients in percent by weight were prepared: 20% of cerium oxide as polishing micro-powder, 30% of a shear thickening enhanced phase, 45% of water and 5% of green chemistry environmentally-friendly substances. First, the cerium oxide and the shear thickening enhanced phase were fully mixed in a mixer for 12 hours; then, the mixture of the cerium oxide and the shear thickening enhanced phase was added to water, uniformly stirred until the solution was homogeneous, and then mixed with the green chemistry environmentally-friendly substances at 25° C. to obtain an efficient shear thickening and chemical synergy polishing slurry 5. The shear thickening enhanced phase was natural plant fiber polymers or natural plant fiber polymer based composites (for example, $\Omega\text{-}(OH^-)_c$ or corresponding fiber composites, where $\Omega$ is the functional group in fiber, and c is the number of corresponding $OH^-$). The green chemistry environmentally-friendly substances may be affected by temperature. They were neutral substances at normal temperature. During the machining, they become acidic or alkaline substances in the machining area as the machining temperature changes to a certain value. They can circulate and quickly return to the neutral properties of the initial polishing slurry as the temperature drops at positions outside the machining area, and maintain the original environmentally-friendly properties. The green chemistry environmentally-friendly substances were natural green plant extracts or green chemistry environmentally-friendly mixtures that can realize transformation from the acidic or alkaline property to the neutral property (for example, $H^+_a\text{-}\Theta\text{-}(OH^-)_b$, where $\Theta$ is the function group, a and b are the number of corresponding $H^+$ and $OH^-$).

(3) The prepared polishing slurry was added into the dust-prevention cover 30. The polishing slurry circulating device, comprising a polishing slurry purification device 14, a polishing slurry temperature control and regulation device 15, a device for replenishing the polishing slurry and mixing with the green chemistry environmentally-friendly substances 16, a supply pump 17, a chemical substance supply device 7 and a branch pipeline, was started so that the efficient shear thickening and chemical synergy polishing slurry 5 was supplied to the surfaces of the workpieces 3 by means of the polishing tools 1. The polishing slurry 5 may flow to the surfaces of the workpieces 3 from a hollow tube arranged at a lower end of the polishing tool 1, and may also flow through the machining area on the surfaces of the workpieces 3 from the run-through pores 31. The temperature of the polishing slurry in a working area was regulated by a temperature regulator arranged on the hollow tube.

(4) The driving devices 9 and the driving mechanisms 33 were started so that the polishing tools 1 move relative to the workpieces. Since the workpieces to be machined have flat surfaces made of optical glass, an intelligent system 36 can control, based on the actual solution flow boundary and the shear thickened elastic layer size requirements, the constraint base surfaces 35 to have a certain motion (for example, rotating, moving up and down, to control the boundary and the shear thickened elastic layer size). The solution flow boundary constraint mechanism 2 will be adaptively deformed in the processes of controlling the flow field and dynamic pressure distribution in the polishing area and matching the optical glass concave curved surface shape to be machined, in order to actively match the optical glass concave curved surface shapes and complex curved surfaces to be machined. The solution flow boundary constraint mechanism 2 was deformed to a tiny flat shape as shown in FIG. 1 or 2 to match the optical glass concave curved surface shape and contact state, in order to ensure the subsequent polishing of the optical glass surfaces.

During the polishing process, the temperature of the polishing slurry 5 in the surface layer of the workpieces 3 and the machining area was changed by the temperature regulator 34 so that the temperature at the run-through pores 32 in the solution flow boundary constraint mechanism 2 changes (and, changes due to the heat generated during polishing), and the reversible transformation of the green chemistry environmentally-friendly substances 23 from "the neutral property to the acidic or alkaline property" produces substances or conditioning agents such as $H^+$ and $OH^-$. A certain chemical reaction occurs between the acidic or alkaline particles and the surface layer of the workpieces. The materials on the surfaces of the workpieces 3 were softened. Then, a softened layer 28 was formed on the surfaces of the workpieces 3. Meanwhile, the workpieces 3 which have concave curved surfaces made of optical glass move relative to the polishing tools 1, so that the polishing slurry 5 was shear thickened below the workpieces 3 which have concave curved surfaces made of optical glass and the solution flow boundary constraint mechanism 2 in the polishing tools 1. A shear thickened elastic layer L as shown in FIG. 1 or 2 was formed. The viscosity of the polishing slurry 5 (C-S) in this area was increased. The abrasive particles or micro-powder 22 can be held better to form a thickened particle elastic cluster 24. The abrasive particles or micro-powder 22 in the polishing slurry 5, having a function of polishing, have a micro-cutting effect on the surfaces of the workpieces 3. The microscopic protrusions on the surfaces of the workpieces 3 which have concave curved surfaces made of optical glass (i.e., the microcosmic layer, which forms chips or swarf 26, in the surface layer 27 of the workpieces 3 which have concave curved surfaces made of optical glass) were first removed. Chips or swarf 26 were produced. The fresh surface materials were exposed. The softened layer 28 at the microcosmic depressions has been softened by the polishing slurry 5, and can be quickly removed in the subsequent continuous polishing. The surface roughness was greatly decreased, and the damage to the surfaces and sub-surfaces of the workpieces was reduced. The removal of materials based on the synergy between chemistry and shear thickening greatly increases the machining efficiency of workpieces 3 which have concave curved surfaces made of optical glass.

The polishing slurry 5 was circulated, in an order of supplying, purifying and supplying, by the circulating device comprising a polishing slurry purification device 14, a polishing slurry temperature control and regulation device 15, a device for replenishing the polishing slurry and mixing with the green chemistry environmentally-friendly substances 16, a supply pump 17, a chemical substance supply device 7 and a branch pipeline. The polishing slurry temperature control and regulation device 15 can control the temperature of the polishing slurry at 25° C. to 50° C. By cooling by supplying cold water in an "M" shape, it can quickly regulate the temperature to a suitable range. A polishing slurry property adjustment device 6 was arranged on the branch pipeline. The chemical substance supply device 7 can supply green chemistry environmentally-friendly substances to the inlet 8 of the polishing tool 1 (can supply substances such as $H^+$ and $OH^-$ or other conditioning agents). The processed polishing slurry 12 becomes the polishing slurry 5 that was used for machining, after flowing through the polishing slurry purification device 14, the polishing slurry temperature control and regulation device 15, the device for replenishing the polishing slurry and mixing with the green chemistry environmentally-friendly substances 16, and the supply pump 17. The polishing slurry 5 was purified by the polishing slurry purification device 14. The polishing slurry purification device 14 comprises: a multi-dimensional filter device, which hierarchically and multi-dimensionally filters debris (capable of filtering and purifying not only conductive metallic plastics and also non-conductive materials that were difficult to machine, such as hard and brittle or soft and brittle materials) and purities resulted during the machining process, a collector for effective substances in the polishing slurry, etc. The metallic materials may be separated by electromagnetic force effect and vibration. The hard and brittle or soft and brittle materials may be separated by hierarchically screening according to the particle size. The device for replenishing the polishing slurry and mixing with the green chemistry environmentally-friendly substances 16 supplies the polishing slurry 5.

Embodiment 3

As shown in FIG. 4, when workpieces, which have convex curved surfaces made of optical glass and which have a diameter of 30 mm and a focal length of 80 mm, were to be machined, the method comprises following steps.

(1) Workpieces were fixed to a polishing and fixing disc 31 of implementation equipment. Three workpieces and polishing systems 29 therefor were fixed to the polishing and fixing disc 31. This facilitates the improvement of the production efficiency.

(2) An efficient shear thickening and chemical synergy polishing slurry was prepared. Following ingredients in percent by weight were prepared: 10% of $Al_2O_3$ as polishing micro-powder, 25% of a shear thickening enhanced phase, 39% of water and 26% of green chemistry environmentally-friendly substances. First, the $Al_2O_3$ and the shear thickening enhanced phase were fully mixed in a mixer for 12 hours; then, the mixture of the $Al_2O_3$ and the shear thickening enhanced phase was added to water, uniformly stirred until the solution was homogeneous, and then mixed with the green chemistry environmentally-friendly substances at 25° C. to obtain an efficient shear thickening and chemical synergy polishing slurry 5. The shear thickening enhanced phase was natural plant fiber polymers or natural plant fiber polymer based composites (for example, $\Omega\text{-}(OH^-)_c$ or corresponding fiber composites, where $\Omega$ is the functional group in fiber, and c is the number of corresponding $OH^-$). The green chemistry environmentally-friendly substances may be affected by temperature. They were neutral substances at normal temperature. During the machining, they become acidic or alkaline substances in the machining area as the machining temperature changes to a certain value. They can circulate and quickly return to the neutral properties of the initial polishing slurry as the temperature drops at positions outside the machining area, and maintain the original environmentally-friendly properties. The green chemistry environmentally-friendly substances were natural green plant extracts or green chemistry environmentally-friendly mixtures that can realize transformation from the acidic or alkaline property to the neutral property (for example, $H^+_a\text{-}\Theta\text{-}(OH^-)_b$, where $\Theta$ is the function group, a and b are the number of corresponding $H^+$ and $OH^-$).

(3) The prepared polishing slurry was added into the dust-prevention cover 30. The polishing slurry circulating device, comprising a polishing slurry purification device 14, a polishing slurry temperature control and regulation device 15, a device for replenishing the polishing slurry and mixing with the green chemistry environmentally-friendly substances 16, a supply pump 17, a chemical substance supply device 7 and a branch pipeline, was started so that the efficient shear thickening and chemical synergy polishing slurry 5 was supplied to the surfaces of the workpieces 3 by means of the polishing tools 1. The polishing slurry 5 may flow to the surfaces of the workpieces 3 from a hollow tube arranged at a lower end of the polishing tool 1, and may also flow through the machining area on the surfaces of the workpieces 3 from the run-through pores 31. The temperature of the polishing slurry in a working area was regulated by a temperature regulator arranged on the hollow tube.

(4) The driving devices 9 and the driving mechanisms 33 were started so that the polishing tools 1 move relative to the workpieces. Since the workpieces to be machined have flat surfaces made of special optical glass, an intelligent system 36 can control, based on the actual solution flow boundary and the shear thickened elastic layer size requirements, the constraint base surfaces 35 to have a certain motion (for example, rotating, moving up and down, to control the boundary and the shear thickened elastic layer size). The solution flow boundary constraint mechanism 2 will be adaptively deformed in the processes of controlling the flow field and dynamic pressure distribution in the polishing area and matching the optical glass convex curved surface shapes to be machined, in order to actively match the optical glass convex curved surface shapes and complex curved surfaces to be machined. The solution flow boundary constraint mechanism 2 was deformed to a tiny flat shape as shown in FIG. 1 or 2 to match the optical glass convex curved surface shape and contact state, in order to ensure the subsequent polishing of the optical glass surfaces.

During the polishing process, the temperature of the polishing slurry 5 in the surface layer of the workpieces 3 and the machining area was changed by the temperature regulator 34 so that the temperature at the run-through pores 32 in the solution flow boundary constraint mechanism 2 changes (and, changes due to the heat generated during polishing), and the reversible transformation of the green chemistry environmentally-friendly substances 23 from "the neutral property to the acidic or alkaline property" produces substances or conditioning agents such as $H^+$ and $OH^-$. A certain chemical reaction occurs between the acidic or alkaline particles and the surface layer of the workpieces. The materials on the surfaces of the workpieces 3 were softened. Then, a softened layer 28 was formed on the surfaces of the workpieces 3. Meanwhile, the workpieces 3 which have convex curved surfaces made of optical glass move relative to the polishing tools 1, so that the polishing slurry 5 was shear thickened below the workpieces 3 which have convex curved surfaces made of optical glass and the solution flow boundary constraint mechanism 2 in the polishing tools 1. A shear thickened elastic layer L as shown in FIG. 1 or 2 was formed. The viscosity of the polishing slurry 5 (C-S) in this area was increased. The abrasive particles or micro-powder 22 can be held better to form a thickened particle elastic cluster 24. The abrasive particles or micro-powder 22 in the polishing slurry 5, having a function of polishing, have a micro-cutting effect on the surfaces of the workpieces 3. The microscopic protrusions on the surfaces of the workpieces 3 which have convex curved surfaces made of optical glass (i.e., the microcosmic layer, which forms chips or swarf 26, in the surface layer 27 of the workpieces 3 which have convex curved surfaces made of optical glass) were first removed. Chips or swarf 26 were produced. The fresh surface materials were exposed. The softened layer 28 at the microcosmic depressions has been softened by the polishing slurry 5, and can be quickly removed in the subsequent continuous polishing. The surface roughness was greatly decreased, and the damage to the surfaces and sub-surfaces of the workpieces was reduced. The removal of materials based on the synergy between chemistry and shear thickening greatly increases the machining efficiency of workpieces which have convex curved surfaces made of optical glass.

The polishing slurry 5 was circulated, in an order of supplying, purifying and supplying, by the circulating device comprising a polishing slurry purification device 14, a polishing slurry temperature control and regulation device 15, a device for replenishing the polishing slurry and mixing with the green chemistry environmentally-friendly substances 16, a supply pump 17, a chemical substance supply device 7 and a branch pipeline. The polishing slurry temperature control and regulation device 15 can control the temperature of the polishing slurry at 25° C. to 50° C. By cooling by supplying cold water in an "M" shape, it can quickly regulate the temperature to a suitable range. A polishing slurry property adjustment device 6 was arranged on the branch pipeline. The chemical substance supply device 7 can supply green chemistry environmentally-friendly substances to the inlet 8 of the polishing tool 1 (can supply substances such as $H^+$ and $OH^-$ or other conditioning agents). The processed polishing slurry 12 becomes the polishing slurry 5 that was used for machining, after flowing through the polishing slurry purification device 14, the polishing slurry temperature control and regulation device 15, the device for replenishing the polishing slurry and mixing with the green chemistry environmentally-friendly substances 16, and the supply pump 17. The polishing slurry 5 was purified by the polishing slurry purification device 14. The polishing slurry purification device 14 comprises: a multi-dimensional filter device, which hierarchically and multi-dimensionally filters debris (capable of filtering and purifying not only conductive metallic plastics and also non-conductive materials that were difficult to machine, such as hard and brittle or soft and brittle materials) and purities resulted during the machining process, a collector for effective substances in the polishing slurry, etc. The metallic materials may be separated by electromagnetic force effect and vibration. The hard and brittle or soft and brittle materials may be separated by hierarchically screening according to the particle size. The device for replenishing the polishing slurry and mixing with the green chemistry environmentally-friendly substances 16 supplies the polishing slurry 5.

The invention claimed is:

1. An efficient ultra-precise shear thickening and chemical synergy polishing method, characterized in that implementation equipment for this method comprises polishing tools, polishing tool holders, a polishing and fixing disc, a dust-prevention cover and a polishing slurry circulating device; the polishing and fixing disc is mounted in the dust-prevention cover, configured to receive workpieces, and connected to driving mechanisms; the polishing tool holders, on which the polishing tools are mounted, are arranged on the dust-prevention cover, and driving devices connected to the polishing tools are arranged on the top of the polishing tool holders; the polishing tools are arranged in the dust-prevention cover and located exactly above workpiece holders; and a polishing slurry outlet is formed on the bottom of the dust-prevention cover;

each of the polishing tools comprises a polishing slurry property adjustment chamber and a hollow tube, an upper end of the hollow tube is connected to an outlet of the polishing slurry property adjustment chamber, an inlet of the polishing slurry property adjustment chamber is connected to an outlet of the polishing slurry circulating device, and an inlet of the polishing slurry circulating device is connected to the polishing slurry outlet, and a temperature regulator is arranged on the hollow tube; a cavity, in which a solution flow boundary constraint mechanism is arranged, is formed at a lower end of the polishing tool, and the solution flow boundary constraint mechanism can realize active constraint of the solution flow and fit surface shapes of workpieces;

the method comprises the following steps:
(1) fixing workpieces to the polishing and fixing disc of implementation equipment;
(2) preparing a polishing slurry, the polishing slurry containing following ingredients in percent by weight: 10 wt. % to 20 wt. % of polishing abrasive particles or micro-powder, 20 wt. % to 30 wt. % of a shear thickening enhanced phase, 39 wt. % to 50 wt. % of water and 1 wt. % to 26 wt. % of green chemistry environmentally-friendly substances, specifically: first, fully mixing the polishing abrasive particles or micro-powder and the shear thickening enhanced phase in a mixer, then adding the mixture of the polishing abrasive particles or micro-powder and the shear thickening enhanced phase to water, uniformly stirring, and then mixing with the green chemistry environmentally-friendly substances to obtain a shear thickening and chemical synergy polishing slurry;
(3) adding the prepared polishing slurry into the dust-prevention cover, starting the polishing slurry circulating device so that the polishing slurry is supplied to the surfaces of the workpieces by means of the polishing tools, and regulating the temperature of the polishing slurry in a working area by the temperature regulator arranged on a hollow tube; and
(4) starting driving devices and driving mechanisms, so that the polishing tools move relative to the workpieces, and processing surfaces of the workpieces are polished.

2. The efficient ultra-precise shear thickening and chemical synergy polishing method according to claim 1, characterized in that the polishing abrasive particles or micro-powder in the step (2) is one or more of $Al_2O_3$, CBN, diamond, $SiO_2$, cerium oxide, and SiC.

3. The efficient ultra-precise shear thickening and chemical synergy polishing method according to claim 1, characterized in that the shear thickening enhanced phase in the step (2) is natural plant fiber polymers or natural plant fiber polymer based composites, and the green chemistry environmentally-friendly substances are natural green plant extracts or green chemistry environmentally-friendly mixtures that can realize transformation from the acidic or alkaline property to the neutral property.

4. The efficient ultra-precise shear thickening and chemical synergy polishing method according to claim 1, characterized in that the polishing slurry circulating device of the implementation equipment comprises a polishing slurry purification device, a polishing slurry temperature control and regulation device, a device for replenishing the polishing slurry and mixing with the green chemistry environmentally-friendly substances, a supply pump, a chemical substance supply device and a branch pipeline; an inlet of the supply pump is connected to the polishing slurry outlet via a pipe, and the polishing slurry purification device, the polishing slurry temperature control and regulation device, and the device for replenishing the polishing slurry and mixing with the green chemistry environmentally-friendly substances are arranged on the pipe; an outlet of the supply pump is connected to an inlet of the chemical substance supply device, and an outlet of the chemical substance supply device is connected to the inlet of the polishing slurry property adjustment chamber; an inlet of the branch pipeline is connected to a pipe to which the outlet of the supply pump and the inlet of the chemical substance supply device are connected, and an outlet of the branch pipeline is arranged correspondingly to the workpieces; and a polishing slurry property adjustment device is arranged on the branch pipeline; and in the step (4), during the polishing process, when the polishing slurry needs to be replenished, the polishing slurry is replenished by adding the polishing slurry to the device for replenishing the polishing slurry and mixing with the green chemistry environmentally-friendly substances; when the green chemistry environmentally-friendly substances need to be replenished, the green chemistry environmentally-friendly substances are replenished by adding the green chemistry environmentally-friendly substances to the device for replenishing the polishing slurry and mixing with the green chemistry environmentally-friendly substances or to the chemical substance supply device; and when the property of the polishing slurry needs to be adjusted, the property of the polishing slurry is adjusted by the polishing slurry property adjustment device.

* * * * *